(12) United States Patent
Wang et al.

(10) Patent No.: US 11,828,604 B2
(45) Date of Patent: Nov. 28, 2023

(54) METHOD AND APPARATUS FOR POSITIONING VEHICLE, ELECTRONIC DEVICE, AND STORAGE MEDIUM

(71) Applicant: APOLLO INTELLIGENT CONNECTIVITY (BEIJING) TECHNOLOGY CO., LTD., Beijing (CN)

(72) Inventors: Kun Wang, Beijing (CN); Xiaofei Rui, Beijing (CN); Xing Hu, Beijing (CN)

(73) Assignee: APOLLO INTELLIGENT CONNECTIVITY (BEIJING) TECHNOLOGY CO., LTD., Beijing (CN)

( * ) Notice: Subject to any disclaimer, the term of this patent is extended or adjusted under 35 U.S.C. 154(b) by 229 days.

(21) Appl. No.: 17/365,216

(22) Filed: Jul. 1, 2021

(65) Prior Publication Data

US 2021/0326640 A1    Oct. 21, 2021

(30) Foreign Application Priority Data

Jul. 20, 2020    (CN) .......................... 202010700675.2

(51) Int. Cl.
*G06K 9/00* (2022.01)
*G01C 21/30* (2006.01)
(Continued)

(52) U.S. Cl.
CPC ............. *G01C 21/30* (2013.01); *G06F 18/22* (2023.01); *G06V 20/56* (2022.01)

(58) Field of Classification Search
None
See application file for complete search history.

(56) References Cited

U.S. PATENT DOCUMENTS

2017/0169300 A1    6/2017    Heisele et al.
2018/0239032 A1    8/2018    Thiel et al.
(Continued)

FOREIGN PATENT DOCUMENTS

CN    106323288 A    1/2017
CN    110017841 A    7/2019
(Continued)

OTHER PUBLICATIONS

Office Action for Japanese Application No. 2021-111532, dated Jul. 26, 2022, 4 pages.
(Continued)

*Primary Examiner* — Soo Jin Park
(74) *Attorney, Agent, or Firm* — Lippes Mathias LLP (57) ABSTRACT

A method for positioning a vehicle, a vehicle and an electronic device are disclosed, which relate to a field of automatic driving and intelligent transportation. The method includes: obtaining a map related to a region, the region being a region where a positioning signal such as a GNSS signal is limited, such as a tunnel, the region including a plurality of positioning markers, and the map including positioning mark data corresponding to the plurality of positioning markers; capturing image data for the region when the vehicle travels through the region; and determining positioning information of the vehicle by matching the image data with the positioning mark data in the map based on an estimated posture of the vehicle. The map here may be a high-precision map.

18 Claims, 5 Drawing Sheets

(51) Int. Cl.
      *G06V 20/56*       (2022.01)
      *G06F 18/22*       (2023.01)

(56) References Cited

U.S. PATENT DOCUMENTS

| | | | | |
|---|---|---|---|---|
| 2019/0189006 | A1* | 6/2019 | Toma | B60W 50/14 |
| 2020/0191975 | A1* | 6/2020 | Watanabe | G02B 13/06 |

FOREIGN PATENT DOCUMENTS

| | | | |
|---|---|---|---|
| CN | 110095752 | A | 8/2019 |
| CN | 110136199 | A | 8/2019 |
| CN | 110954112 | A | 4/2020 |
| CN | 110969055 | A | 4/2020 |
| CN | 111220154 | A | 6/2020 |
| EP | 2372304 | A2 | 10/2011 |
| JP | 2018031616 | A | 3/2018 |
| JP | 2019045364 | A | 3/2019 |
| KR | 20190077014 | A | 7/2019 |
| KR | 20190082068 | A | 7/2019 |
| KR | 20190134231 | A | 12/2019 |

OTHER PUBLICATIONS

Office Action for Chinese Application No. 202010700675.2, dated Sep. 3, 2021, 10 pages.
Notification to Grant Patent for Chinese Application No. 202010700675.2, dated Mar. 18, 2022, 4 pages.
Extended European Search Report for Application No. 21183378.5, dated Apr. 21, 2022, 5 pages.
Partial European Search Report for Application No. 21183378.5, dated Dec. 13, 2021, 12 pages.
OA for KR application 10-2021-0094941, dated Jan. 18, 2023.

* cited by examiner

FIG. 8

METHOD AND APPARATUS FOR POSITIONING VEHICLE, ELECTRONIC DEVICE, AND STORAGE MEDIUM

CROSS-REFERENCE TO RELATED APPLICATION

The present application is based upon and claims priority to Chinese Patent Application No. 202010700675.2, filed on Jul. 20, 2020, the entire contents of which are incorporated herein by reference.

FIELD

The disclosure relates to a field of automatic driving and intelligent transportation, and particularly relates to a method and an apparatus for positioning a vehicle, a device, and a storage medium.

BACKGROUND

With the development of automatic driving technologies, automatic driving may have already been implemented in various scenarios. For example, the automatic driving may be implemented with the assistance of various positioning signals from such as a global navigation satellite system (GNSS). However, due to the diversity of scenes faced by the automatic driving, for example, the positioning signal may be unstable in some specific scenes. Therefore, it is a research hotspot how to implement the automatic driving in various specific scenes.

SUMMARY

According to a first aspect of the disclosure, a method for positioning a vehicle is provided. The method includes: obtaining a map related to a region. The region includes a plurality of positioning markers. The map includes positioning mark data corresponding to the plurality of positioning markers. The method also includes: capturing image data for the region when the vehicle travels through, the region. The method also includes: determining positioning information of the vehicle by matching the image data with the positioning mark data in the map based on an estimated posture of the vehicle.

According to a second aspect of the disclosure, a vehicle is provided. The vehicle may include an image capturing device, a storage device and a positioning device. The image capturing device may be configured to capture image data when the vehicle travels through a region, in which the region comprising a plurality of positioning markers and a positioning signal for the region is limited. The storage device may be configured to store a map related to the region, in which the map includes positioning mark data corresponding to the plurality of positioning markers. The positioning device may be configured to determine positioning information of the vehicle by matching the image data with the positioning mark data in the map based on an estimated posture of the vehicle.

According to a third aspect of the disclosure, an electronic device is provided. The electronic device includes: at least one processor and a memory. The memory is communicatively coupled to the at least one processor. The memory is configured to store instructions executable by the at least one processor. The at least one processor is caused to execute the method according to the first aspect of the disclosure when the instructions are executed by the at least one processor.

It should be understood that, the contents described in the Summary are not intended to identify key or important features of embodiments of the disclosure, nor is it intended to limit the scope of the disclosure. Other features of the disclosure will become apparent from the following description.

BRIEF DESCRIPTION OF THE DRAWINGS

The above and other features, advantages and aspects of respective embodiments of the disclosure will become more apparent with reference to accompanying drawings and following detailed illustrations. In the accompanying drawings, the same or similar numeral references represent the same or similar elements.

DETAILED DESCRIPTION

Description will be made below to exemplary embodiments of the disclosure with reference to accompanying drawings, which includes various details of embodiments of the disclosure to facilitate understanding and should be regarded as merely examples. Therefore, it should be recognized by the skilled in the art that various changes and modifications may be made to the embodiments described herein without departing from the scope and spirit of the disclosure. Meanwhile, for clarity and conciseness, descriptions for well-known functions and structures are omitted in the following description.

In the description of embodiments of the disclosure, the term "includes" and its equivalents should be understood as an open "include". The term "based on" should be understood as "based at least in part". The term "an embodiment" or "the embodiment" should be understood as "at least one embodiment". The terms "first", "second", and the like may refer to different or the same objects. Other explicit and implicit definitions may also be included below.

Stable high-precision positioning is a foundation of automatic driving and intelligent transportation as a positioning error of the automatic driving needs be controlled within a centimeter level. In an open region, high-precision positioning may use various positioning signals, such as signals from a global satellite navigation system (GNSS) alone, or signals from the GNSS combined with a real-time kinematic (RTK) technique, or signals from the GNSS combined with an inertial navigation system (INS). However in some closed regions (such as, a tunnel), the positioning signal is limited, which means that the positioning signal may be weak or unreceivable, and thus the high-precision positioning may not be achieved by the above-mentioned positioning signals.

For these relatively closed environments, positioning schemes based on a GNSS simulator (such as, a pseudo-satellite technology), an ultra-wideband (UWB) and the like have been proposed presently. These positioning schemes have low accuracy or a high total cost due to a need for installing a large number of hardware devices such as base stations.

In order to at least partially solve one or more of the above problems and other potential problems, embodiments of the disclosure provide a technical solution for positioning a vehicle. In the technical solution, a positioning marker is arranged in a specific environment region, and a pose (i.e., position and posture) of the vehicle is adjusted for matching by using a high-precision map including positioning mark data and a captured image including the positioning marker, thereby implementing the high-precision positioning. In this way, in a region without the positioning signals from such as the GNSS combined with RTIC, the high-precision positioning of the vehicle may be implemented by utilizing an existing low-cost hardware device of the vehicle without providing additional hardware devices. In addition, an existing object in the region may be directly used as the positioning marker for auxiliary positioning, so only a small number of positioning markers need to be installed or even without additional installation, thereby having a low total cost.

Description will be made in detail below to embodiments of the disclosure with reference to accompanying drawings.

Figure 1:
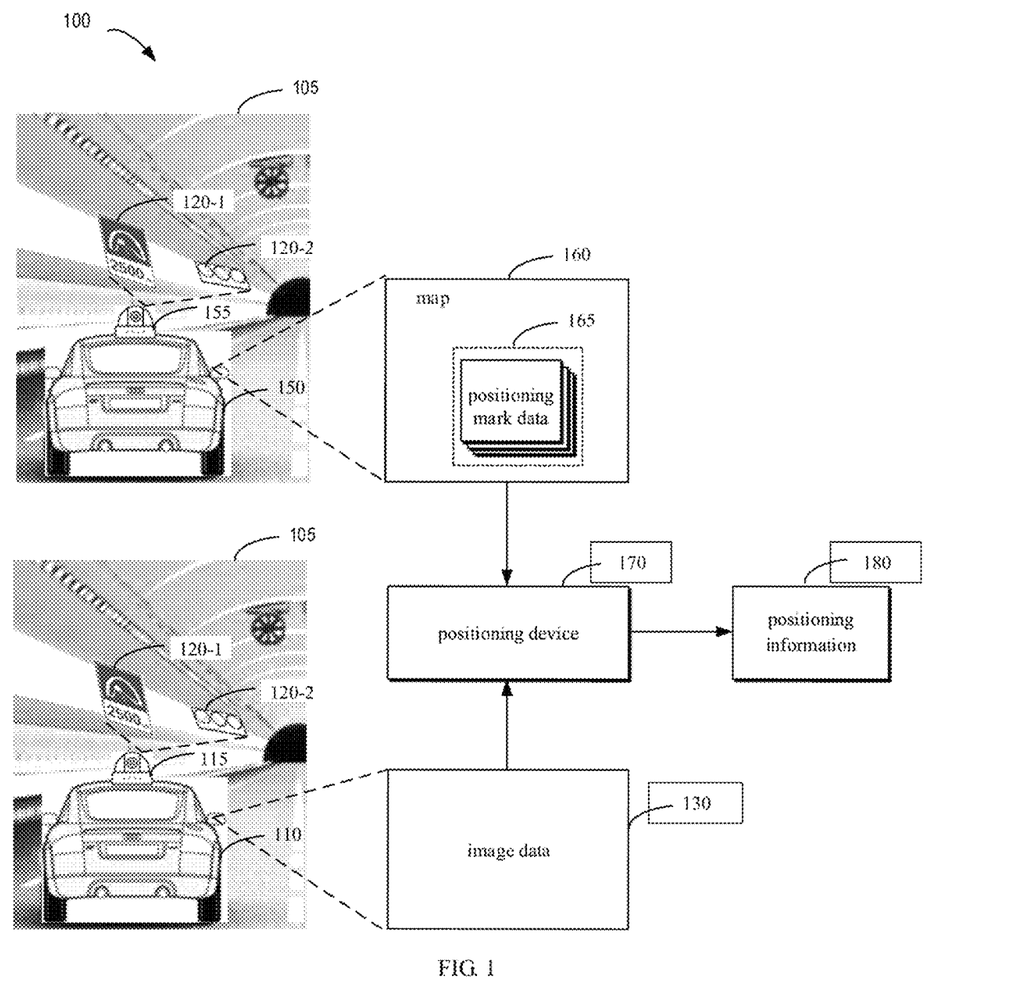
FIG. 1 is a schematic diagram illustrating an exemplary environment 100 where embodiments of the disclosure are implemented.

FIG. 1 is a schematic diagram illustrating an exemplary environment 100 where a plurality of embodiments of the disclosure are implemented. As illustrated in FIG. 1, a vehicle 110 is traveling in a region 105. The region 105 may be a region (such as a tunnel) where the positioning signal such as the GNSS signal is limited. In the region 105, a plurality of positioning markers are arranged, such as positioning markers 120-1 and 120-2. It may be understood that, although two positioning markers are illustrated in FIG. 1, there may be any number of positioning markers, which is not limited by the disclosure. In the context, description will be made in detail to details about the positioning marker with reference to FIG. 3.

In some embodiments, the vehicle 110 may be equipped with a certain automatic driving capability. The automatic driving capability may include, but be not limited to, an assisted driving capability, a semi-automatic driving capability, a highly automatic driving capability or a fully automatic driving capability. The vehicle 110 may capture image data 130 of the surrounding environment, particularly image data associated with the positioning markers 120-1 and 120-2, through an image capturing device 115 fixed or installed on the vehicle 110. The image capturing device 115 includes at least one sensor. In some embodiments, the image capturing device 115 may be one or more wide-angle or ultra-wide-angle cameras capable of capturing a scene within 360 degrees of the surrounding environment. Alternatively, the image capturing device 115 may also employ a rotatable structure to detect real-time scenes in a plurality of directions outside the vehicle 110 rotatably.

The vehicle 110 also includes a positioning device 170. The positioning information 180 of the vehicle 110 may be determined by the positioning device 170 based on various data. The various data may include image data 130 and a map 160. The map 160 includes positioning mark data 165. As explained in detail below, the map 160 and the positioning mark data 165 may be generated at least through a capturing device 155 of a mapping vehicle 150. In some embodiments, the positioning information 180 includes at least one of a position and an attitude of the vehicle 110. In some embodiments, the positioning information 180 includes both the position and the posture. In some embodiments, the positioning information 180 may merely include a position.

In the context, the term "posture" refers to a posture of a vehicle in a specific coordinate system. For example, in a two-dimensional coordinate system, the posture of the vehicle may be expressed by a heading angle. In a three-dimensional coordinate system, the posture of the vehicle may also be expressed by a pitch angle, a heading angle and a rotation angle. Hereinafter, embodiments of the disclosure may be discussed with taking the heading angle as an example of the posture. However, it should be understood that, this is merely for purposes of an example and is not intended to limit the scope of the disclosure.

In addition, the term "vehicle" hereinafter sometimes takes a traveling vehicle as an example of the vehicle. It should be understood that, embodiments of the disclosure may be similarly applied to other objects, such as an aircraft.

The map 160 may be related to the region 105. The map 160 may be predetermined by the mapping vehicle 150 while the vehicle is traveling through the region 105, and may be provided to the positioning device 170 of the vehicle 110. The mapping vehicle 150 may include the capturing device 155. In addition to the image sensor such as the camera, the capturing device 155 may also include other sensors and detection devices for mapping, such as a laser radar, a millimeter wave radar, a GNSS and an inertial measurement device, etc. The laser radar refers to a device that detects a characteristic quantity such as a position and/or speed of a target by emitting laser beams. A working principle of the laser radar is emitting a detection signal (the laser beam) to the target, comparing a received signal (target echoes) reflected from the target with the emitted signal, performing appropriate processing on the received signal, and obtaining relevant information of the target, such as one or more of the parameters such as a target distance, an azimuth, a height, a speed, a posture and even a shape. The millimeter wave radar refers to a radar of which a working frequency band is within a millimeter-wave band. A ranging principle of the millimeter wave radar is similar to that of a common radar. The millimeter wave radar sends a detection signal (a radio wave) to the target, receives echoes, and measures information related to the target based on a time difference between receiving the echoes and sending the detection signal. The GNSS is not limited to a global positioning system (GPS), a Galileo satellite positioning system in Europe, a Beidou satellite positioning system in China, etc., and may be used in combination with embodiments of the disclosure.

The map 160 may include the plurality of pieces of positioning mark data 165 corresponding to the plurality of positioning markers (such as, 120-1 and 120-2). The positioning mark data 165 indicates an association between feature data of the plurality of positioning markers and a plurality of three-dimensional positions in the map 160. For example, for the positioning marker 120-1 in the plurality of positioning markers, parameters such as a latitude, a longitude and elevation information of the positioning marker 120-1 and a plurality of key points on the positioning maker 120-1 may be determined by processing the data collected by the vehicle 150 and may be both stored in the map 160 in association with each other. In the context, the key points are sometimes called feature points.

It should be understood that, in some embodiments, in addition to the image capturing device 115, the vehicle 110 may also include other sensors or detection devices for the automatic driving. For example, the vehicle 110 may also include the laser radar, the satellite positioning system, the inertial measurement device, and the like. In some embodiments, the positioning information 180 may be used as a positioning constraint, which is fused based on a Kalman filter together with the positioning constraints determined by other sensor systems (such as, an inertial navigation, and the laser radar), to achieve the high-precision positioning by a multi-sensor fusion. In addition, it should be understood that the environment 100 illustrated in FIG. 1 is merely an exemplary environment of embodiments of the disclosure, which is not used to limit the scope of the disclosure.

For convenience of clear explanation, description will be made below to embodiments of the disclosure with reference to the environment 100 of FIG. 1. It should be understood that, embodiments of the disclosure may also include additional actions not illustrated and/or omit the illustrated actions. The scope of the disclosure is not limited in this respect. For convenience of understanding, detailed data mentioned in following description is all exemplary and not used to limit the protection scope of the disclosure.

Figure 2:
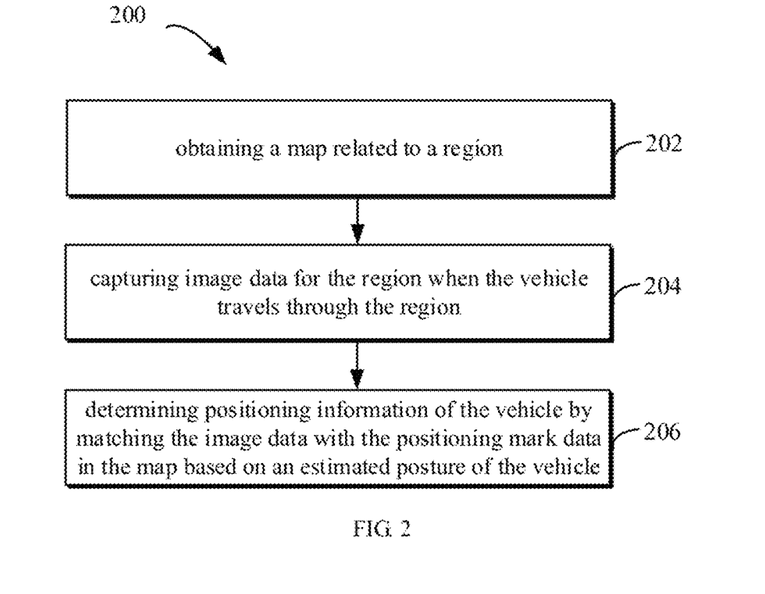
FIG. 2 is a flow chart illustrating a method 200 for positioning a vehicle according to some embodiments of the disclosure.

FIG. 2 is a flow chart illustrating a method 200 for positioning a vehicle, according to some embodiments of the disclosure. In some embodiments, the method 200 may be implemented by the vehicle 110 illustrated in FIG. 1.

At block 202, the vehicle 110 may obtain the map 160 related to the region 105. The region 105 includes a plurality of positioning markers (120-1, 120-2, etc.). The map 160 includes the plurality of pieces of positioning mark data 165 corresponding to the plurality of positioning markers.

The region 105 may be a region with a limited positioning signal (such as, the GNSS signal). For example, the region 105 may be a tunnel, and a city canyon. In such a region, some existing objects in the region may be used as the positioning markers. Alternatively, in case that there is no object that may be used as the positioning marker in the region, some objects may be artificially arranged as the positioning markers.

Figure 3:
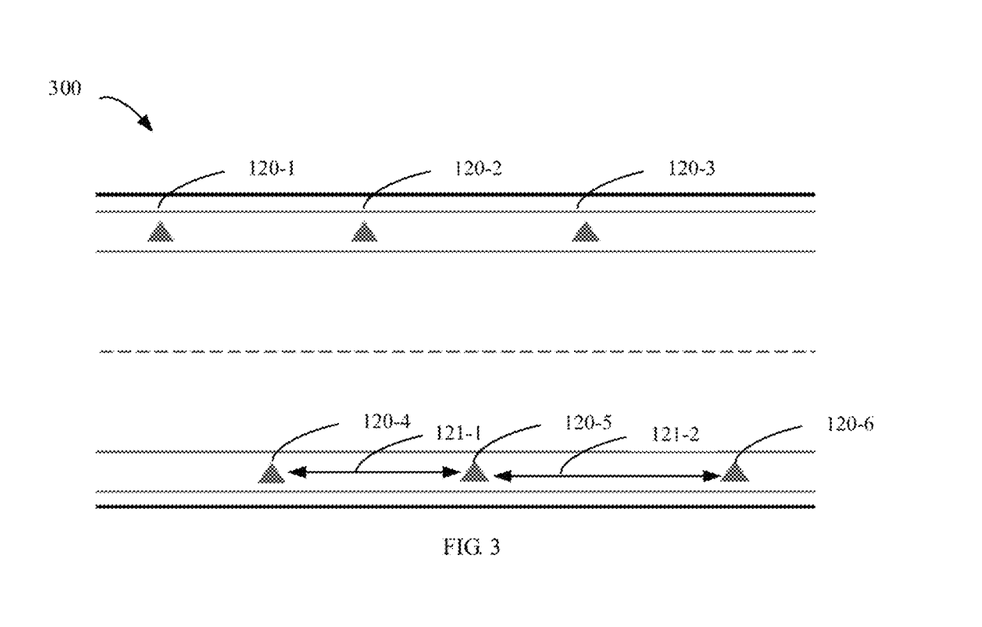
FIG. 3 is a schematic diagram illustrating an arrangement 300 of positioning markers in a region 105 according to some embodiments of the disclosure.

Referring to FIG. 3, FIG. 3 is a schematic diagram illustrating an arrangement 300 of positioning markers in a region 105 according to some embodiments of the disclosure. As an example, the region may be a tunnel having a lane and side walls on both sides of the lane. The positioning markers may include 120-1, 120-2, and 120-3 on one side wall (such as, a side wall close to the traveling vehicle). Further, the positioning markers may also include 120-4, 120-5 on the opposite side wall (such as, the side wall away from the traveling vehicle). The positioning marker may have a certain three-dimensional volume (such as, a sum of a length, a width and a height>1.5 meters) made of an easily recognizable material (for example, having easily recognizable reflectivity and color) with an easily recognizable texture (such as, a pattern and a numbers) on the positioning marker.

In some embodiments, the positioning maker may be an existing transportation infrastructure in the region 105 (such as, positioning marker 120-1 to 120-5), including but not limited to, an electrical cabinet, a traffic sign, a traffic light, protrudes and depressions of a wall, a mural/billboard, a platforms, and a seat. In some embodiments, the positioning marker (such as, the positioning mark 120-6) may also be additionally arranged based on a positioning accuracy requirement in the region 105. In some embodiments, an installation height of the positioning marker from a roadway surface is generally no more than 3 meters and no less than 1 meter. In some embodiments, the positioning marker may also be installed at the top of the region 105 as long as the image capturing device 115 of the vehicle 110 may recognize the positioning marker.

In some embodiments, the plurality of positioning markers may be arranged in the region 105 at a preset distance (such as, every 50-100 meters). In some embodiments, the preset distance may be determined based on a size of each positioning marker in the plurality of positioning markers. It may be understood that, the denser the positioning markers in the region 105, the higher the positioning accuracy may be achieved. However, arranging too many positioning markers may bring about an increased cost. In addition, considering that a potential shielding of the positioning markers on the opposite side by other vehicles in the region, the preset distance may be determined merely based on the positioning markers on the same side.

For example, in the embodiment illustrated in FIG. 3, it may be determined whether a next positioning marker needs to be arranged within the preset distance (such as 50 meters) from the positioning marker 120-4 based on the size of positioning marker 120-4 (and/or key point information, such as the number of key points). When a distance 121-1 between the positioning marker 120-5 and the positioning marker 120-4 is less than the preset distance (i.e., 50 meters), the positioning marker 120-5 may be directly utilized and it may be determined that the next positioning marker do not need to be further arranged. Further, it may be determined whether another next positioning marker needs to be arranged within another preset distance (such as, 60 meters) from the positioning marker 120-5 based on the size of the positioning marker 120-5. When there is no available positioning marker in the range (i.e., within 60 meters), the positioning markers 120-6 may be additionally arranged, such that a distance 121-2 between the positioning markers 120-5 and 120-6 is less than or equal to the preset distance (i.e., 60 meters). The plurality of positioning markers may be different from each other, and may be the same or similar to each other (such as, in terms of size, pattern, etc.).

Referring back to FIG. 2, the map 160 related to the region 105 is obtained, for example, by the positioning device 170 of the vehicle 110. The map 160 includes the plurality of pieces of positioning mark data 165 corresponding to the plurality of positioning markers (such as, 120-1 to 120-6). In some embodiments, the positioning mark data 165 is predetermined, and indicates an association between feature data of the plurality of positioning markers and a plurality of three-dimensional positions in the map 160. Hereinafter, description will be made in detail to details about generating the map with reference to FIG. 4.

In some embodiments, the vehicle 170 may obtain the map 160 related to the region 105 in response to determining that the vehicle 110 is about to enter the region 105. In some embodiments, the vehicle may determine that the vehicle 110 is about to enter the region 105 in response to a predetermined distance away from one end (e.g., a tunnel entrance) of the region 105. The predetermined distance may ensure that the map may be sent (e.g., downloaded) to a storage device (not illustrated) of the vehicle 110 for use of the positioning device 170 before the vehicle 110 enters the region. In some embodiments, the determination may be made based on the GNSS signal. The determination may be made based on data (such as, an image for a tunnel entrance taken by a camera) sensed by a sensor at one end of the region 105. A sending process of the map may be implemented via a radio frequency signal, and may also be implemented by technologies such as edge-to-cloud.

At block 204, the vehicle 110 may capture image data 130 for the region 105 when traveling through the region 105.

In some embodiments, for example, an image may be captured by a vision sensor of the vehicle 110 (such as, the image capturing device 115 in FIG. 1.), and further processed to obtain the image data 130. In some embodiments, the vehicle 110 may implement the positioning process only based on the image captured by the vision sensor together with the map 165, without using data such as the laser radar data, the GNSS signal, the inertial navigation data. As discussed above, since a plurality of positioning markers are arranged in the region 105 based on the preset distance, the captured image generally includes at least one positioning marker.

At block 206, the vehicle 110 may determine positioning information of the vehicle by matching the image data 130 with the positioning mark data 165 in the map 160 based on an estimated posture of the vehicle 110.

The action at block 206 may be performed at the positioning device 170 of the vehicle 110. The positioning device 170 may obtain the image data 130 through the image capturing device 115 and obtain the map 160 from the storage device (not illustrated). The vehicle may travel in a certain posture (such as, a certain heading angle) at a certain distance from the positioning marker when capturing the image data 130, in which the posture may be different from the posture and/or location of the vehicle when the positioning mark data 165 of the map 160 is generated. Therefore, the positioning device 170 needs to perform some adjustments in the matching process between the image data 130 and the positioning mark data 165 based on the posture of the vehicle 110. The vehicle 110 may not obtain the positioning signal for a long period when driving through the region 105 such as the tunnel, so that the vehicle 110 may not be able to determine its real posture based on a predetermined accuracy. In this case, the real posture of the vehicle 110 may be estimated, and the matching process between the above data may be performed by utilizing the estimated posture. For example, estimated posture(s) in association may be determined based on a posture in the positioning information at a previous moment and/or a posture determined by other sensor of the vehicle 110. An error between the estimated posture(s) and the real posture may be within a predetermined range (e.g., ±5%).

In some embodiments, the positioning device 170 performs an adjustment process for at least one of the image data 130 and the positioning mark data 165 based on the estimated posture of the vehicle 110. The adjustment process may enable the adjusted image data 130 and the adjusted positioning mark data 165 to correspond to the estimated posture (e.g., enable the adjusted image data 130 and the adjusted positioning mark data 165 to correspond to the same heading angle). In some examples, the adjustment process may also enable the adjusted image data 130 and the adjusted positioning mark data 165 to correspond to the estimated position of the vehicle 110. Then, the positioning device 170 determines a matching degree between the image data 130 and the positioning mark data 165 based on a result of the adjustment process. In some examples, the matching degree may be determined by projecting the image data 130 onto an image based on the positioning mark data 165. Next, the positioning device 170 may determine the positioning information 180 of the vehicle 110 relative to a three-dimensional position of the positioning marker in response to determining that the matching degree is greater than a predetermined threshold.

In detail, the positioning device 170 in some embodiments may determine a set of estimated postures and/or estimated positions where the vehicle 110 may be located, for example, based on the positioning information at the previous moment. Then, the positioning device 170 may adjust the image data 130 and the positioning mark data 165 based on the set of estimated postures and/or estimated positions to determine a corresponding set of matching degrees. In some examples, the positioning device 170 may select an optimal matching degree from the set of matching degrees, and determine the positioning information 180 of the vehicle 110 by using the estimated posture and/or estimated position corresponding to the optimal matching degree and a three-dimensional position of a corresponding positioning marker. In some examples, the positioning device 170 may select several optimal matching degrees from the set of matching degrees, and determine the positioning information 180 of the vehicle 110 by using several estimated postures and/or estimated positions corresponding to the several optimal matching degrees and the three-dimensional positions of the corresponding positioning markers in a weighted average manner.

Therefore, according to embodiments of the disclosure, by arranging the positioning markers in the region, the vehicle may implement the high-precision positioning by using a high-precision map including the positioning mark data and the captured image related to the positioning marker. In this way, in the region lacking of the positioning signal, the vehicle may be positioned in a high precision by using the existing low-cost hardware device (e.g., the vision sensor) of the vehicle without deploying other hardware device. In addition, the existing objects in the region may be directly used as the positioning markers for auxiliary positioning, so there is no need to install or only a small number of positioning markers need to be installed, thereby reducing a total cost of the solution.

Figure 4:
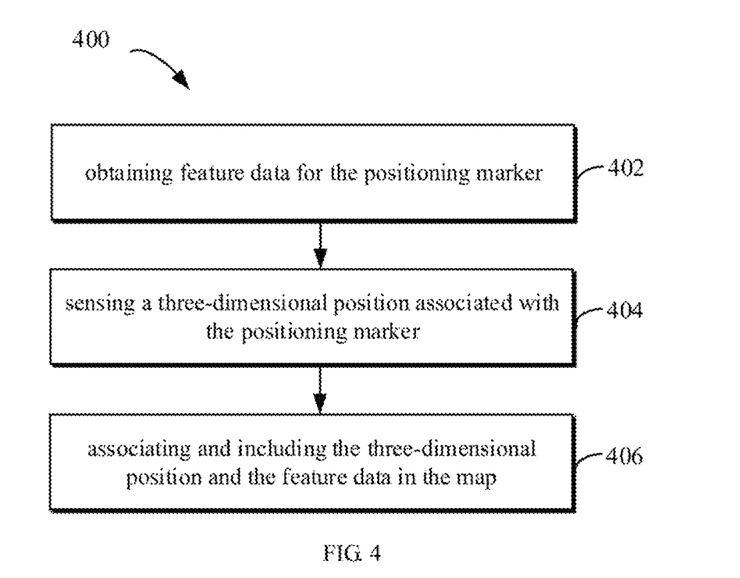
FIG. 4 is a flow chart illustrating a process 400 for generating a map according to some embodiments of the disclosure.

FIG. 4 is a flow chart illustrating a process 400 for generating a map according to some embodiments of the disclosure. The process 400 is configured to generate the map used in the method 200. In some embodiments, the process 400 may be implemented at the mapping vehicle 150 illustrated in FIG. 1, or a part of process may be implemented locally at the mapping vehicle 150 and the other part may be implemented in a remote server or cloud. The following description will take the positioning markers 120-1 from the plurality of positioning markers in the region 105 as an example.

At block 402, the mapping vehicle 150 may obtain feature data for the positioning marker 120-1.

As discussed above, the positioning marker 120-1 may have a certain three-dimensional volume with a certain texture (such as, a pattern). In some embodiments, the mapping vehicle 150 may capture a plurality of images related to the positioning marker 120-1 by the vision sensor while driving at different positions in the region 105. In some embodiments, the mapping vehicle 150 may capture point cloud data related to the positioning marker 120-1 by the laser radar while driving at different positions in the region 105. The obtained plurality of images and/or point cloud data may be further processed (for example, by fusing the plurality of images and point cloud data) to obtain the key points that may be the points for deep attention features.

In some embodiments, the obtained key points may be deduplicated and compressed to reduce a size of feature data.

At block 404, the mapping vehicle 150 may sense a three-dimensional position associated with the positioning marker 120-1.

In some embodiments, the mapping vehicle 150 may sense the three-dimensional position associated with the positioning marker 120-1 by using the laser radar, the inertial navigation system, etc. The three-dimensional position includes but not is limited to the latitude, the longitude, and the height (e.g., an altitude and/or height relative to the road surface). In some embodiments, the mapping vehicle 150 may sense the three-dimensional position corresponding to the key points recognized at block 402.

At block 406, the three-dimensional position and the feature data may be associated and included in the map 160.

It may be understood that the process 400 may be similarly applied to other positioning markers in the plurality of positioning markers to obtain the positioning mark data 165. In some embodiments, the positioning mark data 165 may be stored as a layer in the map 160. In some embodiments, the map 160 may be updated every predetermined period to ensure compliance with the latest road condition. In some embodiments, the map may be stored in a server or cloud for use of the vehicle 110.

In this way, the high-precision map in the region 105 such as a tunnel where the positioning signal is limited may be determined in advance. The map includes the positioning mark data 165. The positioning mark data 165 indicates the association between the feature data and the three-dimensional position of each positioning marker in the plurality of positioning markers in the map. The map may be configured as a basis for implementing positioning the vehicle 110 traveling in the region 105.

Figure 5:
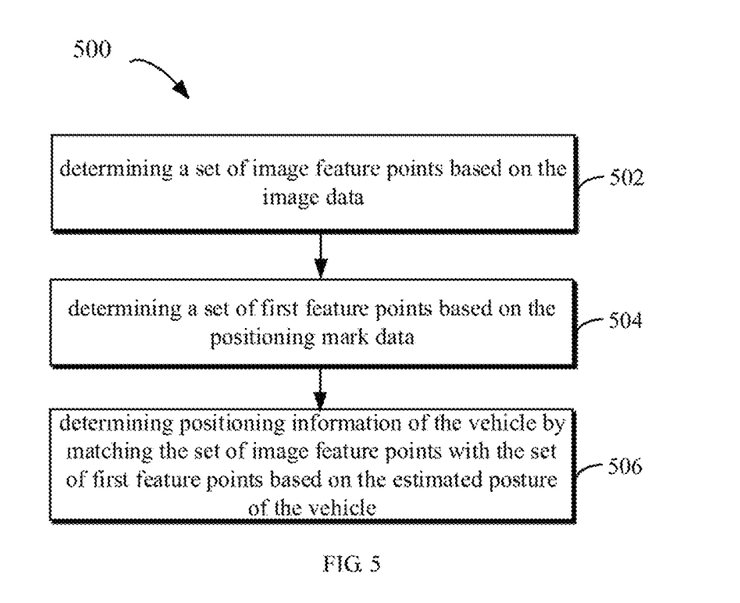
FIG. 5 is a flow chart illustrating a process 500 for determining positioning information of a vehicle according to some embodiments of the disclosure.

FIG. 5 is a flow chart illustrating a process 500 for determining positioning information of a vehicle according to some embodiments of the disclosure. For example, the process 500 may be regarded as an example implementation of the action at block 206 in the method 200 illustrated in FIG. 2. In some embodiments, the process 500 may be implemented at the positioning device 170 of the vehicle 110 illustrated in FIG. 1.

At block 502, the positioning device 170 may determine a set of image feature points based on the image data 130.

As discussed above, the image data 130 generally includes the plurality of positioning markers. In some embodiments, the positioning device may process the image data 130 to recognize the set of image feature points corresponding to all the positioning markers (such as, 120-1 and 120-2 in FIG. 1) included in the image data 130 from different viewing angle.

At block 504, the positioning device 170 may determine a set of first feature points based on the positioning mark data 165.

As discussed above, the positioning mark data 165 in the map 160 may be feature data associated with the positioning marker. In some embodiments, the positioning device may process the positioning mark data 165 to determine the set of first feature points. The set of first feature points is associated with all the positioning markers (such as, 120-1 and 120-2 in FIG. 1) included in the image data 130.

At block 506, the positioning device 170 may determine the positioning information 180 of the vehicle 110 by matching the set of image feature points with the set of first feature points based on the estimated posture of the vehicle 110.

In detail, the matching process may be a point-to-point matching process, which may be implemented by projecting one set of feature points (such as, the set of image feature points) to another set of feature points (such as, the set of first feature points), and calculating a coincidence degree between the two sets. As discussed above, before the matching process, at least one of the set of image feature points and the set of first feature points may be adjusted based on the estimated posture of the vehicle 110 (such as, rotating an angle corresponding to the estimated posture), thereby adjusting to a state corresponding to the estimated posture of the vehicle 110. The vehicle 110 may be in different postures when driving through the region 105 such as the tunnel where the positioning signal is limited. Therefore, the image data 130 captured by the vehicle 110 in different postures may be different from each other, and there may be some deviations from the posture of the mapping vehicle at which the positioning mark data 165 in the map 160 is captured by the mapping vehicle. In this case, when the captured image data 130 is directly used for matching with the positioning mark data 165 in the map 160, it is possible to result in a positioning error. The adjustments are first performed based on the estimated posture of the vehicle and then image data 130 is matched with the positioning mark data 165, thereby reducing or eliminating the possibility of the positioning error caused by the posture and improving the positioning accuracy.

At least one of the set of image feature points and the set of first feature points may also be adjusted (e.g., enlarged or reduced) based on a distance between the estimated position of the vehicle 110 and the three-dimensional position of the positioning marker (e.g., 120-1 and 120-2 in FIG. 1), thereby adjusting to a state corresponding to the estimated position of the vehicle 110.

In some embodiments, the positioning mark data 165 in the map 160 may store a plurality of sets of feature points associated with the positioning markers (e.g., 120-1 and 120-2 in FIG. 1). The plurality of sets of feature points correspond to the plurality of estimated positions, and may be generated in advance based on the plurality of estimated positions or the data actually collected by the mapping vehicle 150. After the adjustments are performed based on the estimated posture, the set of image feature points may be matched with the plurality of sets of feature points, and thus an estimated position with a highest matching degree is determined from the plurality of estimated positions as an indication of the position of the vehicle 110.

Figure 6:
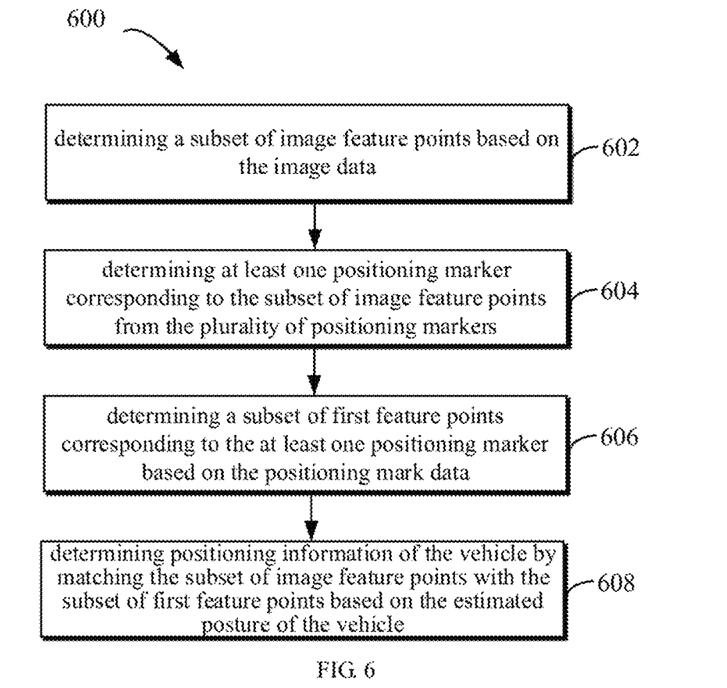
FIG. 6 is a flow chart illustrating a process 600 for determining positioning information of a vehicle according to some embodiments of the disclosure.

FIG. 6 is a flow chart illustrating a process 600 for determining positioning information of a vehicle according to some embodiments of the disclosure. For example, the process 600 may be regarded as an example implementation of the action at block 206 in the method 200 illustrated in FIG. 2. In some embodiments, the process 600 may be implemented at the positioning device 170 of the vehicle 110 illustrated in FIG. 1.

At block 602, the positioning device 170 may determine a subset of image feature points based on the image data 130.

As discussed above, the image data 130 generally includes a plurality of positioning markers. The plurality of positioning markers may be located on one side and/or the opposite side of the vehicle. In some embodiments, considering that a potential shielding of the positioning markers on the opposite side by other vehicles in the region and a poor recognition on distant positioning markers, the positioning device 130 may further process the image data 130 to determine the subset of image feature points by removing feature points with poor effects and distant feature points. In some embodiments, the positioning device 170 may recognize the set of image feature points based on a process similar to that described at block 502, and determine the subset of image feature points therefrom. In some embodiments, the positioning device 170 may cut and select a part of the image data from the image data 130. The subset of image feature points are thus recognized and determined based on the part of the image data, thereby reducing the amount of computation.

At block 604, the positioning device 170 may determine at least one positioning marker corresponding to the subset of image feature points from the plurality of positioning markers.

In some embodiments, the subset of image feature points obtained at block 602 may, for example, be associated with at least one positioning marker close to the vehicle 110 and without shielding (for example, on the traveling side). The positioning device 170 may determine at least one positioning marker corresponding to the subset of image feature points from the plurality of positioning markers. In some embodiments, the positioning device 170 may determine the at least one positioning marker based on the position where the vehicle travels at the previous moment.

At block 606, the positioning device 170 may determine a subset of first feature points corresponding to the at least one positioning marker based on the positioning mark data.

The positioning device 170 may retrieve the subset of first feature points from the positioning mark data 165 based on the at least one positioning marker determined at block 604. In some embodiments, the positioning mark data 165 may be recognized to have an identifier corresponding to each of the plurality of positioning markers. Then the positioning device 170 may retrieve corresponding data, i.e., the subset of first feature points, based on the identifier of at least one positioning marker.

At block 608, the positioning device 170 may determine the positioning information 180 of the vehicle 110 by matching the subset of image feature points with the subset of first feature points based on the estimated posture of the vehicle 110.

The action at block 608 is basically similar to the action at block 506, except that the number of points in the set of feature points is smaller for matching and more consistent with the location of the vehicle 110. In addition, in this way, the amount of computation in the positioning process may be reduced, thereby reducing an overall time consumption in the positioning process and improving the positioning accuracy.

Figure 7:
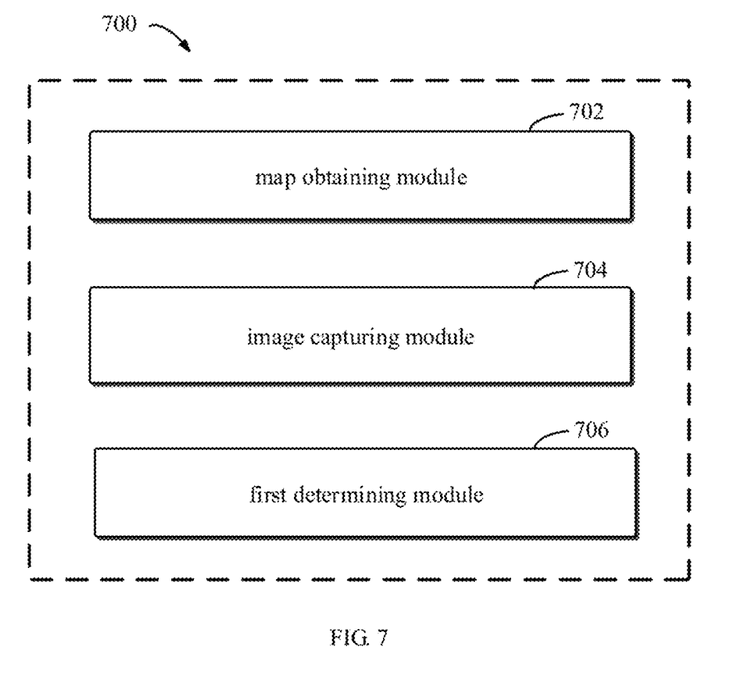
FIG. 7 is a block diagram illustrating an apparatus 700 for positioning a vehicle according to embodiments of the disclosure.

FIG. 7 is a block diagram illustrating an apparatus 700 for positioning a vehicle according to embodiments of the disclosure. As illustrated in FIG. 7, the apparatus 700 may include a map obtaining module 702, configured to obtain a map related to a region. The region includes a plurality of positioning markers. The map includes positioning mark data corresponding to the plurality of positioning markers. The apparatus 700 may also include an image capturing module 704, configured to capture image data for the region when the vehicle travels through the region. The apparatus 700 may also include a first determining module 706, configured to determine positioning information of the vehicle by matching the image data with the positioning mark data in the map based on an estimated posture of the vehicle.

In some embodiments, the positioning mark data is predetermined, and the positioning mark data indicates an association between feature data of the plurality of positioning markers and a plurality of three-dimensional positions in the map.

In some embodiments, the first determining module 706 also includes: a second determining module and a processing module. The second determining module is configured to determine a set of image feature points based on the image data. The processing module is configured to determine a set of first feature points based on the positioning mark data. The first determining module 706 is configured to determine the positioning information of the vehicle by matching the set of image feature points with the set of first feature points based on the estimated posture of the vehicle.

In some embodiments, the first determining module 706 also includes: a third determining module, a fourth determining module, and a fifth determining module. The third determining module is configured to determine a subset of image feature points based on the image data. The fourth determining module is configured to determine at least one positioning marker corresponding to the subset of image feature points from the plurality of positioning markers. The fifth determining module is configured to determine a subset of first feature points corresponding to the at least one positioning marker based on the positioning mark data. The first determining module 706 is configured to determine the positioning information of the vehicle by matching the subset of image feature points with the subset of first feature points based on the estimated posture of the vehicle.

In some embodiments, the first determining module 706 also includes: a data adjusting module and a sixth determining module. The data adjusting module is configured to perform an adjustment process for at least one of the image data and the positioning mark data based on the estimated posture of the vehicle. The sixth determining module is configured to determine a matching degree between the image data and the positioning mark data based on a result of the adjustment process. The first determining module 706 is configured to determine the positioning information of the vehicle relative to a three-dimensional position of the positioning marker in response to determining that the matching degree is greater than a predetermined threshold.

In some embodiments, a positioning signal for the region is limited.

In some embodiments, the plurality of positioning markers are arranged in the region at a preset distance, and the preset distance is determined based on a size of each positioning marker in the plurality of positioning markers.

In some embodiments, the map obtaining module 702 is also configured to obtain the map related to the region in response to determining that the vehicle is about to enter the region.

In some embodiments, the image capturing module 704 is also configured to: capture the image data by a vision sensor of the vehicle.

In some embodiments, the positioning information of the vehicle includes at least one of a position and an attitude of the vehicle.

According to embodiments of the disclosure, the disclosure also provides an electronic device and a readable storage medium.

Figure 8:
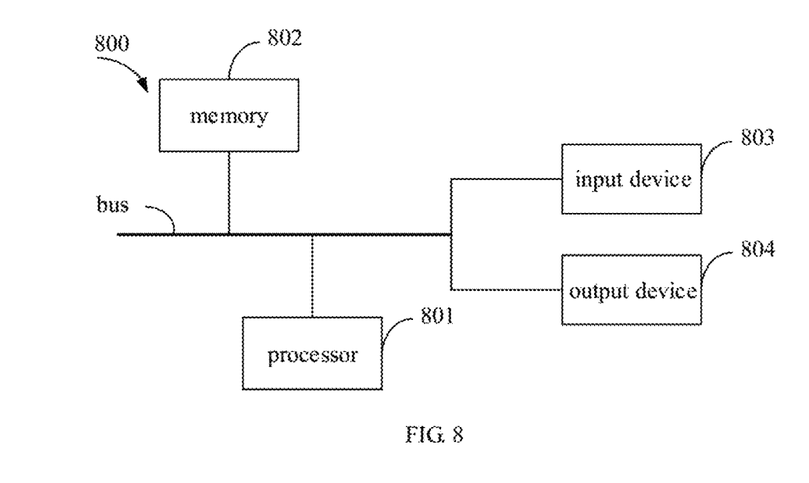
FIG. 8 is a block diagram illustrating an electronic device 800 capable of implementing a plurality of embodiments of the disclosure.

As illustrated in FIG. 8, FIG. 8 is a block diagram illustrating an electronic device 800 capable of implementing a method for positioning a vehicle according to embodiments of the disclosure. The electronic device aims to represent various forms of digital computers, such as a laptop computer, a desktop computer, a workstation, a personal digital assistant, a server, a blade server, a mainframe computer and other suitable computer. The electronic device may also represent various forms of mobile devices, such as personal digital processing, a cellular phone, a smart phone, a wearable device and other similar computing device. The components, connections and relationships of the components, and functions of the components illustrated herein are merely examples, and are not intended to limit the implementation of the disclosure described and/or claimed herein.

As illustrated in FIG. 8, the electronic device includes: one or more processors 801, a memory 802, and interfaces for connecting various components, including a high-speed interface and a low-speed interface. Various components are connected to each other via different buses, and may be mounted on a common main board or in other ways as required. The processor may process instructions executed within the electronic device, including instructions stored in or on the memory to display graphical information of the GUI (graphical user interface) on an external input/output device (such as a display device coupled to an interface). In other implementations, a plurality of processors and/or a plurality of buses may be used together with a plurality of memories if desired. Similarly, a plurality of electronic devices may be connected, and each device provides some necessary operations (for example, as a server array, a group of blade servers, or a multiprocessor system). In FIG. 8, a processor 801 is taken as an example.

The memory 802 is a non-transitory computer readable storage medium provided by the disclosure. The memory is configured to store instructions executable by at least one processor, to enable the at least one processor to execute the method for positioning the vehicle provided by the disclosure. The non-transitory computer readable storage medium provided by the disclosure is configured to store computer instructions. The computer instructions are configured to enable a computer to execute the method for positioning the vehicle provided by the disclosure.

As the non-transitory computer readable storage medium, the memory 802 may be configured to store non-transitory software programs, non-transitory computer executable programs and modules, such as program instructions/module (such as the map obtaining module 702, the image capturing module 704, and the first determining module 706 illustrated in FIG. 7) corresponding to the method for positioning the vehicle according to embodiments of the disclosure. The processor 801 is configured to execute various functional applications and data processing of the server by operating non-transitory software programs, instructions and modules stored in the memory 802, that is, implements the method for positioning the vehicle according to the above method embodiments.

The memory 802 may include a storage program region and a storage data region. The storage program region may store an application required by an operating system and at least one function. The storage data region may store data created according to predicted usage of the electronic device capable of implementing the method for positioning the vehicle based on the semantic representation. In addition, the memory 802 may include a high-speed random access memory, and may also include a non-transitory memory, such as at least one disk memory device, a flash memory device, or other non-transitory solid-state memory device. In some embodiments, the memory 802 may optionally include memories remotely located to the processor 801, and these remote memories may be connected to the electronic device via a network. Examples of the above network include, but are not limited to, an Internet, an intranet, a local area network, a mobile communication network and combinations thereof.

The electronic device capable of implementing the method for positioning the vehicle may also include: an input device 803 and an output device 804. The processor 801, the memory 802, the input device 803, and the output device 804 may be connected via a bus or in other means. In FIG. 8, the bus is taken as an example.

The input device 803 may receive inputted digital or character information, and generate key signal input related to user setting and function control of the electronic device, such as a touch screen, a keypad, a mouse, a track pad, a touch pad, an indicator stick, one or more mouse buttons, a trackball, a joystick and other input device. The output device 804 may include a display device, an auxiliary lighting device (e.g., LED), a haptic feedback device (e.g., a vibration motor), and the like. The display device may include, but be not limited to, a liquid crystal display (LCD), a light emitting diode (LED) display, and a plasma display. In some embodiments, the display device may be the touch screen.

The various implementations of the system and technologies described herein may be implemented in a digital electronic circuit system, an integrated circuit system, an application specific ASIC (application specific integrated circuit), a computer hardware, a firmware, a software, and/or combinations thereof. These various implementations may include: being implemented in one or more computer programs. The one or more computer programs may be executed and/or interpreted on a programmable system including at least one programmable processor. The programmable processor may be a special purpose or general purpose programmable processor, may receive data and instructions from a storage system, at least one input device, and at least one output device, and may transmit data and the instructions to the storage system, the at least one input device, and the at least one output device.

These computing programs (also called programs, software, software applications, or codes) include machine instructions of programmable processors, and may be implemented by utilizing high-level procedures and/or object-oriented programming languages, and/or assembly/machine languages. As used herein, the terms "machine readable medium" and "computer readable medium" refer to any computer program product, device, and/or apparatus (such as, a magnetic disk, an optical disk, a memory, a programmable logic device (PLD)) for providing machine instructions and/or data to a programmable processor, including a machine readable medium that receives machine instructions as a machine readable signal. The term "machine readable signal" refers to any signal for providing the machine instructions and/or data to the programmable processor.

To provide interaction with a user, the system and technologies described herein may be implemented on a computer. The computer has a display device (such as, a CRT (cathode ray tube) or a LCD (liquid crystal display) monitor) for displaying information to the user; a keyboard and a pointing device (such as, a mouse or a trackball), through which the user may provide the input to the computer. Other types of devices may also be configured to provide interaction with the user. For example, the feedback provided to the user may be any form of sensory feedback (such as, visual feedback, auditory feedback, or tactile feedback), and the input from the user may be received in any form (including acoustic input, voice input or tactile input).

The system and technologies described herein may be implemented in a computing system including a background component (such as, a data server), a computing system including a middleware component (such as, an application server), or a computing system including a front-end component (such as, a user computer having a graphical user interface or a web browser through which the user may interact with embodiments of the system and technologies described herein), or a computing system including any combination of such background component, the middleware components and the front-end component. Components of the system may be connected to each other via digital data communication in any form or medium (such as, a communication network). Examples of the communication network include a local area network (LAN), a wide area networks (WAN), and the Internet.

The computer system may include a client and a server. The client and the server are generally remote from each other and generally interact via the communication network. A relationship between the client and the server is generated by computer programs operated on a corresponding computer and having a client-server relationship with each other. The server may be a cloud server, also known as cloud computing server or a cloud host, which is a host product in a cloud computing service system, to solve the defects of difficult management and weak business scalability in a traditional physical host and a VPS service.

According to the technical solution of embodiments of the disclosure, by arranging the positioning markers in the region, the vehicle may implement the high-precision positioning by using the high-precision map including the positioning mark data and the captured image about the positioning marker. In this way, in a region where the positioning signal is limited, the high-precision positioning of the vehicle may be implemented by using the existing low-cost hardware device (for example, the vision sensor) of the vehicle, and no additional hardware device needs to be deployed. In addition, the existing object in the region may be directly used as the positioning marker for auxiliary positioning, so there is no need to install or only a small number of positioning markers need to be installed, thus reducing the total cost of the solution.

It should be understood that, steps may be reordered, added or deleted by utilizing flows in the various forms illustrated above. For example, the steps described in the disclosure may be executed in parallel, sequentially or in different orders, so long as desired results of the technical solution disclosed in the disclosure may be achieved, there is no limitation here.

The above detailed implementations do not limit the protection scope of the disclosure. It should be understood by the skilled in the art that various modifications, combinations, sub-combinations and substitutions may be made based on design requirements and other factors. Any modification, equivalent substitution and improvement made within the spirit and the principle of the disclosure shall be included in the protection scope of disclosure.

What is claimed is:

1. A method for positioning a vehicle, comprising:
   obtaining a map related to a region, the region comprising a plurality of positioning markers, and the map comprising positioning mark data corresponding to the plurality of positioning markers;
   capturing image data for the region when the vehicle travels through the region; and
   determining positioning information of the vehicle by matching the image data with the positioning mark data in the map based on an estimated posture of the vehicle;
   wherein determining the positioning information of the vehicle further comprises:
   performing an adjustment process for at least one of the image data and the positioning mark data based on the estimated posture of the vehicle;
   determining a matching degree between the image data and the positioning mark data based on a result of the adjustment process; and
   determining the positioning information of the vehicle relative to a three-dimensional position of the positioning marker in response to determining that the matching degree is greater than a predetermined threshold.

2. The method of claim 1, wherein the positioning mark data is predetermined, and the positioning mark data indicates an association between feature data of the plurality of positioning markers and a plurality of three-dimensional positions in the map.

3. The method of claim 1, wherein determining the positioning information of the vehicle comprises:
   determining a set of image feature points based on the image data;
   determining a set of first feature points based on the positioning mark data, in which the set of first feature points are associated with all the positioning markers included in the region; and
   determining the positioning information of the vehicle by matching the set of image feature points with the set of first feature points based on the estimated posture of the vehicle.

4. The method of claim 1, wherein determining the positioning information of the vehicle comprises:
   determining a subset of image feature points based on the image data;
   determining at least one positioning marker corresponding to the subset of image feature points from the plurality of positioning markers;
   determining a subset of first feature points corresponding to the at least one positioning marker based on the positioning mark data; and
   determining the positioning information of the vehicle by matching the subset of image feature points with the subset of first feature points based on the estimated posture of the vehicle.

5. The method of claim 1, wherein a positioning signal for the region is limited.

6. The method of claim 1, wherein the plurality of positioning markers are arranged in the region at a preset distance, in which the preset distance is determined based on a size of each positioning marker in the plurality of positioning markers.

7. The method of claim 1, wherein obtaining the map comprises:
   obtaining the map related to the region in response to determining that the vehicle is about to enter the region.

8. The method of claim 1, wherein capturing the image data comprises:
   capturing the image data by a vision sensor of the vehicle.

9. The method of claim 1, wherein the positioning information of the vehicle comprises at least one of a position and an attitude of the vehicle.

10. An electronic device, comprising:
    at least one processor; and
    a memory, communicatively coupled to the at least one processor, wherein the memory is configured to store instructions executable by the at least one processor, and when the instructions are executed by the at least one processor, the at least one processor is caused to execute method for positioning a vehicle, the method comprising:

obtaining a map related to a region, the region comprising a plurality of positioning markers, and the map comprising positioning mark data corresponding to the plurality of positioning markers;

capturing image data for the region when the vehicle travels through the region; and determining positioning information of the vehicle by matching the image data with the positioning mark data in the map based on an estimated posture of the vehicle;

wherein determining the positioning information of the vehicle further comprises:

performing an adjustment process for at least one of the image data and the positioning mark data based on the estimated posture of the vehicle;

determining a matching degree between the image data and the positioning mark data based on a result of the adjustment process; and determining the positioning information of the vehicle relative to a three-dimensional position of the positioning marker in response to determining that the matching degree is greater than a predetermined threshold.

11. The electronic device of claim 10, wherein the positioning mark data is predetermined, and the positioning mark data indicates an association between feature data of the plurality of positioning markers and a plurality of three-dimensional positions in the map.

12. The electronic device of claim 10, wherein determining the positioning information of the vehicle comprises:

determining a set of image feature points based on the image data;

determining a set of first feature points based on the positioning mark data, in which the set of first feature points are associated with all the positioning markers included in the region; and determining the positioning information of the vehicle by matching the set of image feature points with the set of first feature points based on the estimated posture of the vehicle.

13. The electronic device of claim 10, wherein determining the positioning information of the vehicle comprises:

determining a subset of image feature points based on the image data;

determining at least one positioning marker corresponding to the subset of image feature points from the plurality of positioning markers;

determining a subset of first feature points corresponding to the at least one positioning marker based on the positioning mark data; and determining the positioning information of the vehicle by matching the subset of image feature points with the subset of first feature points based on the estimated posture of the vehicle.

14. The electronic device of claim 10, wherein a positioning signal for the region is limited.

15. The electronic device of claim 10, wherein the plurality of positioning markers are arranged in the region at a preset distance, in which the preset distance is determined based on a size of each positioning marker in the plurality of positioning markers.

16. The electronic device of claim 10, wherein obtaining the map comprises:

obtaining the map related to the region in response to determining that the vehicle is about to enter the region.

17. The electronic device of claim 10, wherein capturing the image data comprises:

capturing the image data by a vision sensor of the vehicle.

18. A non-transitory computer readable medium having computer instructions stored thereon, wherein the computer instructions are configured to cause a computer to implement a method for positioning a vehicle, the method comprising:

obtaining a map related to a region, the region comprising a plurality of positioning markers, and the map comprising positioning mark data corresponding to the plurality of positioning markers;

capturing image data for the region when the vehicle travels through the region; and determining positioning information of the vehicle by matching the image data with the positioning mark data in the map based on an estimated posture of the vehicle;

wherein determining the positioning information of the vehicle further comprises:

performing an adjustment process for at least one of the image data and the positioning mark data based on the estimated posture of the vehicle;

determining a matching degree between the image data and the positioning mark data based on a result of the adjustment process; and determining the positioning information of the vehicle relative to a three-dimensional position of the positioning marker in response to determining that the matching degree is greater than a predetermined threshold.

* * * * *